(12) United States Patent
Röhm

(10) Patent No.: US 7,389,993 B2
(45) Date of Patent: Jun. 24, 2008

(54) LOCKABLE HAMMER-DRILL CHUCK

(75) Inventor: Günter Horst Röhm, deceased, late of Sontheim/Brenz (DE); by Anne Lise Röhm, legal representative, Sontheim/Brenz (DE)

(73) Assignee: Rohm GmbH, Sontheim (DE)

( * ) Notice: Subject to any disclaimer, the term of this patent is extended or adjusted under 35 U.S.C. 154(b) by 464 days.

(21) Appl. No.: 11/227,719

(22) Filed: Sep. 15, 2005

(65) Prior Publication Data

US 2006/0055127 A1 Mar. 16, 2006

(30) Foreign Application Priority Data

Sep. 16, 2004 (DE) ......................... 10 2004 044 824

(51) Int. Cl.
*B23B 31/12* (2006.01)
(52) U.S. Cl. .......................................... 279/62; 279/140
(58) Field of Classification Search ............ 279/60–62, 279/66, 134, 140, 902; *B23B 31/12*
See application file for complete search history.

(56) References Cited

U.S. PATENT DOCUMENTS

| 5,741,016 | A | * | 4/1998 | Barton et al. | .................. | 279/62 |
| 5,765,839 | A | * | 6/1998 | Rohm | .......................... | 279/62 |
| 5,829,761 | A | * | 11/1998 | Rohm | .......................... | 279/62 |
| 5,957,469 | A | * | 9/1999 | Miles et al. | .................... | 279/62 |
| 6,341,783 | B1 | * | 1/2002 | Rohm | .......................... | 279/62 |
| 6,550,785 | B2 | * | 4/2003 | Rohm | .......................... | 279/62 |
| 6,554,289 | B1 | * | 4/2003 | Lin | ............................... | 279/62 |
| 6,581,942 | B2 | * | 6/2003 | Rohm | .......................... | 279/62 |
| 7,185,895 | B2 | * | 3/2007 | Cachod et al. | ................. | 279/62 |

* cited by examiner

*Primary Examiner*—Monica S. Carter
*Assistant Examiner*—Eric A Gates
(74) *Attorney, Agent, or Firm*—Andrew Wilford

(57) ABSTRACT

A drill chuck has an externally toothed body, a plurality of jaws, and a tightening ring rotatable on the body in tightening and loosening directions. Screwthreads between the tightening ring and the jaws move the jaws radially. A pawl engageable with the teeth is angularly fixed on the tightening ring and can shift between a retaining position engaging the teeth and a freeing position disengaged from the teeth. An adjustment sleeve is limitedly angularly displaceable on the body relative to the tightening ring between a locked end position and an unlocked end position. A cam on the adjustment sleeve can displace the pawl into the retaining position when the adjustment sleeve is in the locked end position and into the freeing position when the adjustment sleeve is in the unlocked end position. A locking part can engage the pawl in the retaining position thereof to lock the chuck.

20 Claims, 7 Drawing Sheets

LOCKABLE HAMMER-DRILL CHUCK

FIELD OF THE INVENTION

The present invention relates to a chuck. More particularly this invention concerns a lockable chuck for a hammer drill.

BACKGROUND OF THE INVENTION

U.S. Pat. No. 5,765,839 describes a chuck having a chuck body rotatable about a chuck axis and provided centered on the axis with an annular array of teeth each having a steep flank and a shallow flank. A plurality of jaws angularly spaced on the body about the axis are radially displaceable relative to the body between inner and outer positions. A tightening ring is axially fixed but rotatable about the axis on the body in a tightening direction and in an opposite loosening direction. A pair of screwthread formations between the tightening ring and the jaws can move the jaws radially together on rotation of the tightening ring in the tightening direction and radially apart on rotation of the tightening ring in the loosening direction. A pawl engageable with the teeth and angularly fixed on the tightening ring can be radially displaced between a retaining position engaging the teeth and preventing rotation of the body relative to the tightening ring in the loosening direction and a freeing position permitting free rotation of the body relative to the tightening ring in both directions. A setting ring axially fixed but angularly displaceable on the tightening ring is formed with a pair of angularly spaced and radially open seats. A pair of angularly spaced abutments between the setting ring and the tightening ring limit angular movement of the sleeve on the ring to movement between a pair of end positions of the sleeve on the ring. A cam on the setting ring is engageable with the pawl for displacing the pawl into the retaining position when the setting ring is in one of its end positions and for displacing the pawl into the freeing position when the setting ring is in the other of its end positions. A latch member angularly fixed on the tightening ring is engageable in the seats of the setting ring for releasably retaining the setting ring in its end positions. A common spring extending angularly along and fixed angularly in the tightening ring urges the latch member into the seats and the pawl into the freeing position.

Thus with such a chuck, it is possible to hammer drill without the tightening ring reverse rotating to release the bit. In fact the chuck can be set up so that drilling creates a self-tightening action.

The main problem with this arrangement is that when the drill is subjected to considerable vibration or shocks directed radially of the chuck, the pawl can jump out of the teeth and allow the chuck to loosen. Today's chucks can operate at 6000 to 40,000 hammers per minute, so that they are subjected to enormous shock and stress. In addition, such a chuck is normally used under very difficult work conditions so such unintended loosening is a real problem.

OBJECTS OF THE INVENTION

It is therefore an object of the present invention to provide an improved drill chuck.

Another object is the provision of such an improved drill chuck that overcomes the above-given disadvantages, in particular that remains locked and does not loosen, even when subjected to considerable vibration and shocks.

SUMMARY OF THE INVENTION

A drill chuck has according to the invention a chuck body rotatable about a chuck axis and provided centered on the axis with an annular array of teeth, a plurality of jaws angularly spaced on the body about the axis and radially displaceable relative to the body, and a tightening ring axially fixed but rotatable about the axis on the body in a tightening direction and in an opposite loosening direction. A pair of screwthread formations between the tightening ring and the jaws can move the jaws radially together on rotation of the tightening ring in the tightening direction and radially apart on rotation of the tightening ring in the loosening direction. A pawl engageable with the teeth is angularly fixed on the tightening ring. This pawl is radially displaceable between a retaining position engaging the teeth and preventing rotation of the body relative to the tightening ring in the loosening direction and a freeing position disengaged from the teeth and permitting free rotation of the body relative to the tightening ring in both directions. An adjustment sleeve is axially fixed but at least a limitedly angularly displaceable on the body relative to the tightening ring between a locked end position and an unlocked end position. A cam on the adjustment sleeve engageable with the pawl can displace the pawl into the retaining position when the adjustment sleeve is in the locked end position and into the freeing position when the adjustment sleeve is in the unlocked end position. A locking part engageable with the pawl in the retaining position thereof can be pressed against the pawl in the retaining position thereof to lock the chuck.

With this system, therefore, the locking part positively retains the pawl in the retaining position. Even if the chuck is subjected to a considerable radial shock, it will remain locked. This is done in an extremely simple manner without adding significantly to the complexity of the chuck mechanism. On the other hand, in the freeing position, the pawl is completely out of the way and the chuck can easily be loosened. Operation of the chuck is identical to that of the above-discussed prior-art chuck in that the user simply tightens the chuck and automatically shifts the shawl into the retaining position and the pressing means into its locking position as the chuck jaws tighten on a tool. The extra locking function is achieved without any special action of the user.

According to the invention the cam on the adjustment sleeve is a radially inwardly directed cam surface bearing radially on the pawl. The chuck further has according to the invention means for releasably retaining the sleeve in each of its end positions. This means includes an inwardly projecting bump on the sleeve and a radially displaceable element on the ring shiftable past the bump.

In accordance with a further feature of the invention the chuck has a cam formation that shifts the locking part angularly between a position angularly overlapping the pawl and a position angularly offset from the pawl. This happens in the freeing position so that it is impossible for the pawl to hang on the locking part, as this locking part has been moved completely out of the way of the pawl.

According to a particularly interesting feature of the invention a spring extending angularly at least partially around the chuck body has one radially deflectable end forming the pawl and an opposite radially extending end forming the locking part. This spring also has an outwardly projecting region adjacent each of its ends. The sleeve is formed with a pair of inwardly directed cam surfaces engageable with the regions and one of which constitutes the means for pressing the locking part and the other of which constitutes the adjustment-sleeve cam.

The chuck wherein the spring is formed between its ends with another outwardly projecting region and the sleeve is formed with another inwardly directed cam surface engageable with the other outwardly projecting region in the locked end position of the adjustment sleeve to move the locking part from a position angularly overlapping the pawl and a position angularly offset from the pawl. This structure is extremely simple and inexpensive to manufacture, while being very rugged.

According to the invention the chuck can have at least two such pawls, adjustment-sleeve cams, locking parts, and means for pressing. At least two springs each have one radially deflectable end forming one of the pawls and an opposite radially deflectable end forming one of the locking parts. The provision of multiple pawls and such allows the spring constants and holding forces to be tailored to the exact requirements of the particular chuck.

The chuck further can have according to the invention a spring angularly fixed in the tightening ring, extending angularly of the axis outside the chuck body, having an end forming the pawl, and formed adjacent the end with an outwardly projecting region engageable with the adjustment-sleeve cam. This locking part is angularly fixed relative to the tightening ring and radially displaceable. It can extend angularly of the axis outside the chuck body and be angularly fixed relative to the tightening ring. In one system it has an end engageable with the part and an outwardly projecting region engageable with the means for pressing. In another system it is J-shaped.

The chuck further has according to the invention a coupling sleeve angularly fixed to the tightening ring and to the pawl. Here an angularly extending spring has one end forming the pawl, an opposite end forming the locking part, and an outwardly projecting region between these ends engageable with the adjustment-sleeve cam. The coupling sleeve is formed with a window through which the projecting region fits and which angularly locks the coupling sleeve to the spring. The coupling sleeve has an axially projecting portion and the adjustment sleeve is formed with a radially inwardly open notch in which the axially projecting portion is received smith substantial play.

The adjustment-sleeve cam according to the invention and the means for pressing each include an inwardly open cam recess formed on the adjustment sleeve. The pawl and the locking part have radially outwardly projecting regions fitting in the cam recesses in the respective unlocked and freeing positions.

BRIEF DESCRIPTION OF THE DRAWING

The above and other objects, features, and advantages will become more readily apparent from the following description, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing.

SPECIFIC DESCRIPTION

Figure 1:
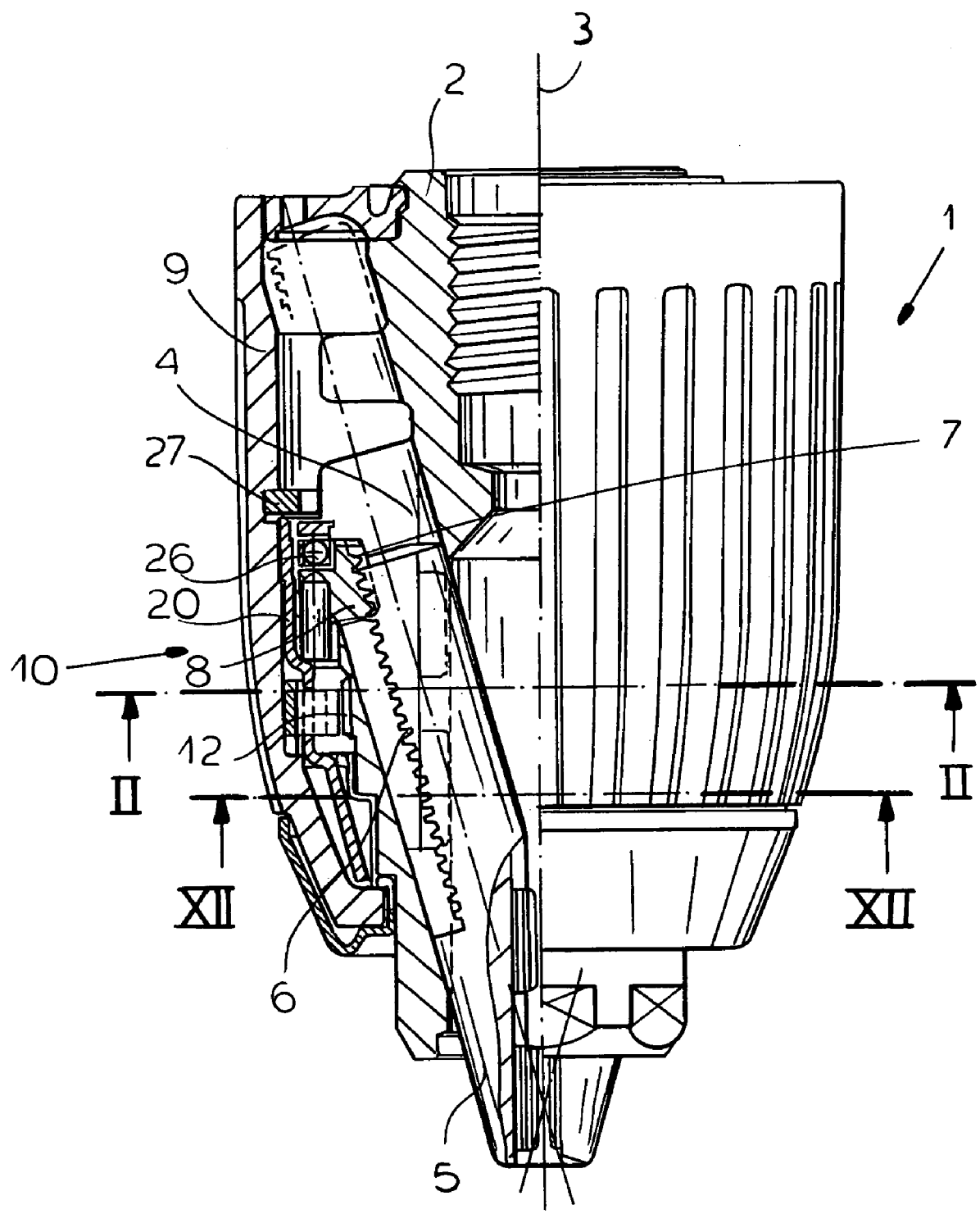
FIG. 1 is a side view partly in axial section through a chuck according to the invention, in the unlocked position.

As seen in FIGS. 1, 2, 3, 4, end 12 a chuck 1 according to the invention has a chuck body 2 centered on an axis 3 and formed with an axially rearwardly open threaded bore that is normally fitted on a drive-unit spindle. Three angularly equispaced jaws 5 are axially and radially displaceable in respective angled guides 4 of the chuck body 2 to grip an unillustrated tool bit and rotate it about the axis 3. A tightening ring 8 rotatable on the chuck body 2 about the axis 3 has an internal screwthread 7 that meshes with external rows of teeth 6 on the backs of the jaws 5 so that when it is rotated on the body 2 in a closing or tightening direction T it brings the jaws 5 forward and together, and when oppositely rotated in an opening or loosening direction L it movies them oppositely. The tightening ring 8, which in formed in two parts, bears axially rearward via a roller bearing 26 on a snap ring 27 set in the body 2 so that it is axially fixed thereon. This ring 8 is rotationally fixed to a sheet-metal coupling sleeve 20 and through it to an outer adjustment sleeve 9 that covers almost the entire exterior of the chuck 1 and that is rotatable on the body 2 about the axis 3.

Figure 12:
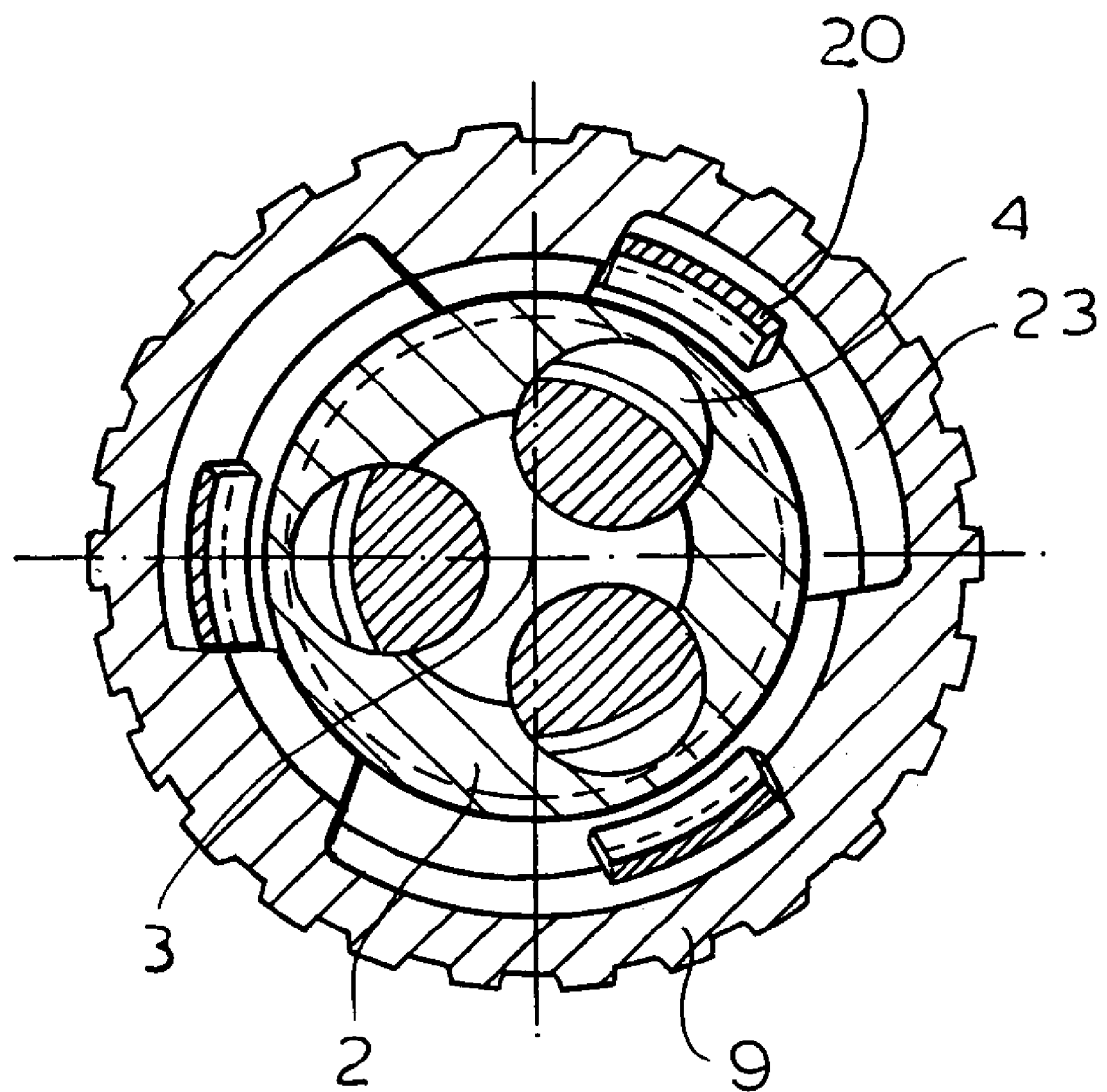
FIG. 12 is a section taken along line XII-XII of FIG. 1.

FIG. 12 shows how the lower end of the sleeve 20 is formed as a plurality of angularly equispaced and separated fingers received in inwardly open notches 23 of the sleeve 9, so that relative rotation of the coupling sleeve 20, which is fixed to the ring 8, is limited with respect to the sleeve 9. Thus the sleeve 9 can move limitedly angularly relative to the sleeve 20 and the ring 8.

A locking mechanism 10 is provided to prevent the tightening ring 8 from rotating in the opening direction L on the chuck body 2 except when this is intentionally desired. This mechanism 10 comprises an annular array of sawteeth 12 on the chuck body 2 and a pawl 11 angularly fixed to the tightening ring 8 and sleeve 20 as will be described below. The teeth 10 each have a steep flank directed back in the loosening direction L and an opposite shallow flank so that the pawl 11 can be cammed out and ratchet only when moving in the tightening direction T. This pawl 11 is moved between a freeing position shown in FIG. 2 permitting the tightening ring 8 and body 2 to rotate relative to each other in either direction L or T and retaining positions shown in FIGS. 3 and 4 only allowing the adjustment sleeve 9 and tightening ring 8 to rotate in the tightening direction T on the body 2, ratcheting on the shallow back flanks.

Figure 3:
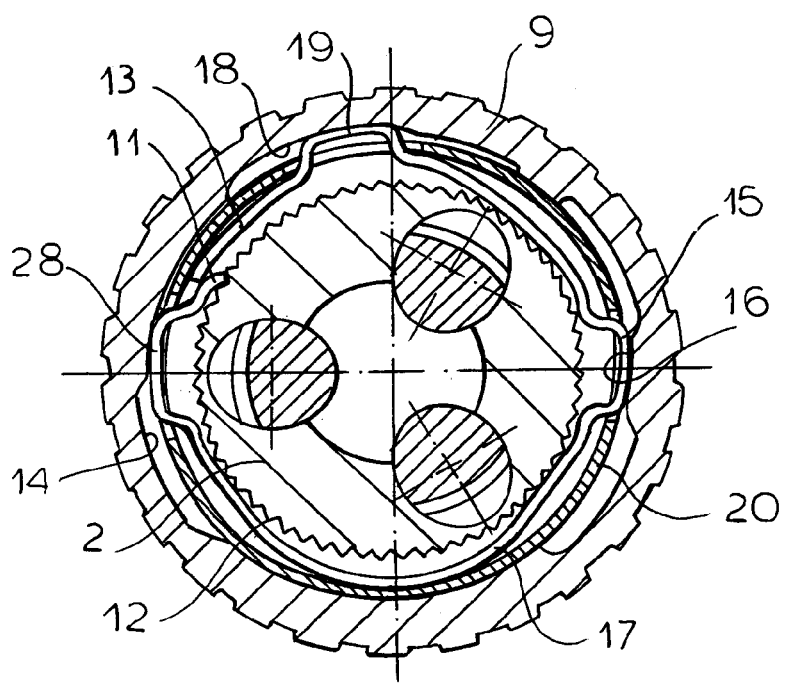
FIG. 3 is a view like FIG. 2 bout in the partially locked position.
Figure 4:
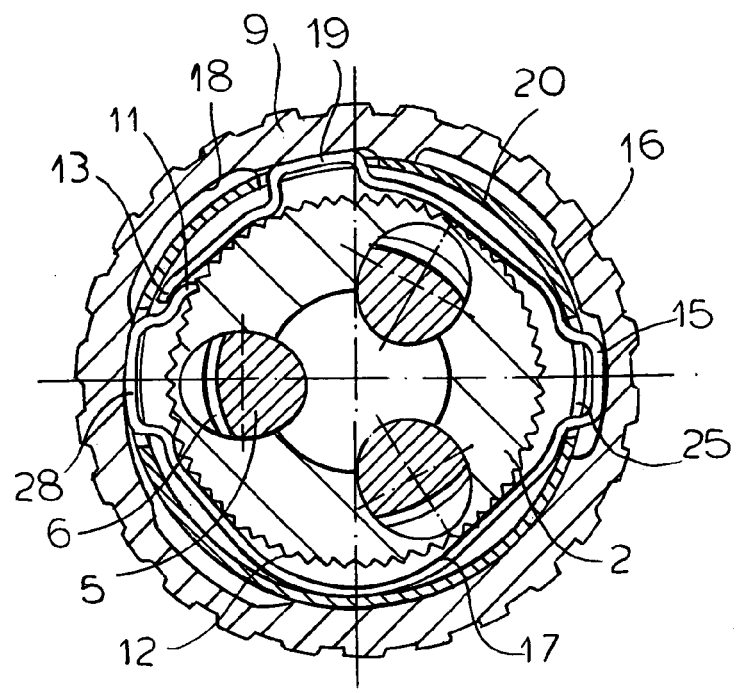
FIG. 4 is a view like FIG. 2 but in the fully locked position.

According to the invention a locking part 13 is angularly displaceable between the FIG. 3 partially locked position radially outwardly and angularly offset from the pawl 11 and the locked positions of FIG. 4 angularly overlapping and bearing radially inward on the pawl 11. In the FIG. 4 position the pawl 11 is solidly locked in the teeth 12 and no relative rotation between the body 2 and sleeve 9 is possible.

A spring 17 has one end forming the pawl 11 and an opposite end forming the part 13 and extends angularly around the axis 3 between these ends, lying between the sleeve 9 and the body 2. This spring 17 has adjacent the pawl 11 an outwardly directed U-shaped cam region 28 engaged only in the FIG. 2 unlocked position in a radially inwardly open cam recess 14 formed in the adjustment sleeve 9. In both the FIG. 3 and FIG. 4 positions the region 28 is out of the recess 14 and is pressed by an inner cam surface of the sleeve 9 into the inner retaining position engaging the teeth 12.

Figure 2:
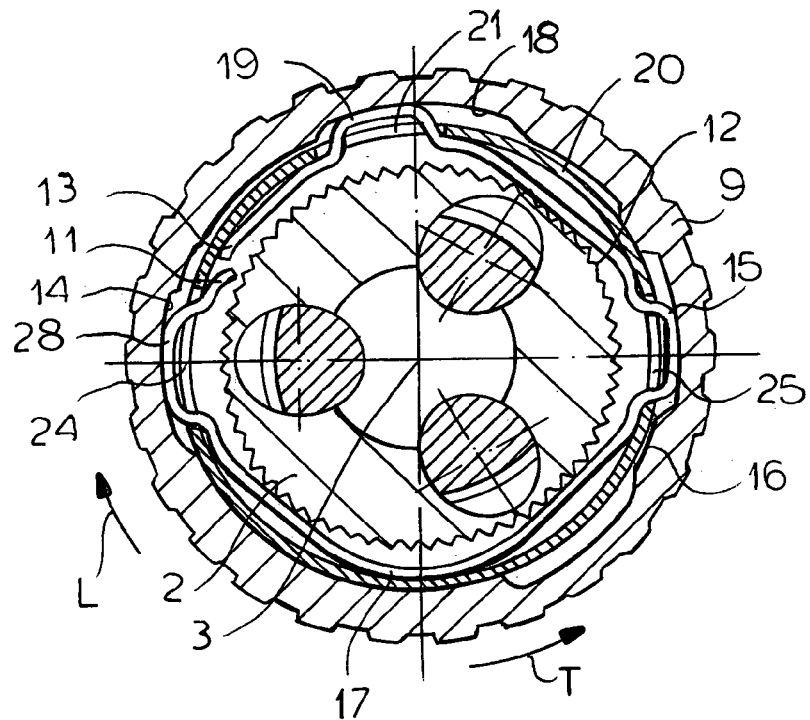
FIG. 2 is a section taken along line II-II of FIG. 1.

Similarly, the spring 17 has adjacent the part 13 an outwardly directed U-shaped region 19 engaged in the unlocked position of FIG. 2 and the semilocked position of FIG. 3 in a radially inwardly open cam recess 18 formed in the adjustment sleeve 9. In the FIG. 4 fully locked position the cam region 19 has moved out of the recess 18 and the part 13 is pressed radially inward against the back of the pawl 11, solidly holding it in engagement with the teeth 12 so that even if the chuck 1 is being subjected to severe vibration, the pawl 11 will remain engaged and the chuck will not loosen.

The spring 17 also has between the regions 28 and 19 another outwardly directed U-shaped region 15 that engages a cam bump 16 formed in the adjustment sleeve 9 only in the semilocked position of FIG. 3. In the unlocked position of FIG. 2, the cam region 15 is to one side of the bump 16, and in the locked position of FIG. 4 it is to the other side of this bump 16. Pushing of the region 15 radially inward with the bump 16 causes the part 13 to move angularly from the FIG. 2 position offset angularly slightly from the pawl 11 to the position shown in FIG. 3 angularly overlapping the pawl 11. Thus in the FIG. 2 unlocked position the pawl 11 is free to move radially outward well clear of the teeth 12. In the partially and fully locked positions of FIGS. 3 and 4 the radial inward displacement effected by the cam formations 16 and 18 serves to angularly shift the part 13 so it can effectively press radially inward on the back of the pawl 11. The bump 16 and the region 15 also serve to retain the sleeve 9 releasably in the FIG. 2 unlocked position and the FIG. 4 locked position.

The regions 15, 19, and 28 engage through respective holes 25, 21, and 24 in the coupling sleeve 20. Thus this spring 17 is effectively rotationally locked to this sleeve 20 and through it to the tightening ring 8.

With this system, therefore, in the FIG. 2 unlocked position the region 28 actuating the pawl 11 is in its recess 14 so that the adjustment ring 9 can freely spin the tightening ring 8 in either direction L or T. At the same time, the region 15 is offset from the bump 16 so that the part 13 is angularly offset from the pawl 11, and the region 19 is in the recess 18 so that the part 13 is also offset radially outward from the pawl 11. So long as nothing offers significant resistance to rotation of the ring 9 in either direction, the friction of the regions 15, 19, and 29 on the sleeve 9 will be enough to rotationally couple the sleeve 9 through the spring 17 to the sleeve 20 and through it to the tightening ring 8.

Presuming the sleeve 9 is being rotated in the tightening direction T, as soon as the jaws 5 engage a workpiece, they will resist further rotation of the tightening ring 8, coupling sleeve 20, and spring 17. The adjustment sleeve 9 will then shift in the direction T from the FIG. 2 position to the FIG. 3 position relative to the sleeve 20 and ring 8. Such action at first moves the bump 28 out of the recess 14 to push the pawl 11 inward into engagement with the teeth 12, while simultaneously pushing in the region 15 with the cam bump 16 so as to angularly shift the part 13 so that its tip angularly, overlaps the pawl 11.

On further rotation of the sleeve 9 in the direction T into the FIG. 4 position, the region 19 is moved out of the recess 18 to press the part 13 inward against the outer face of the pawl 11, locking it in the teeth 12. The region 15 moves off the bump, but this makes no difference as the part 13 is in solid contact with the pawl 11, and the region 28 remains outside the recess 14.

Figure 5:
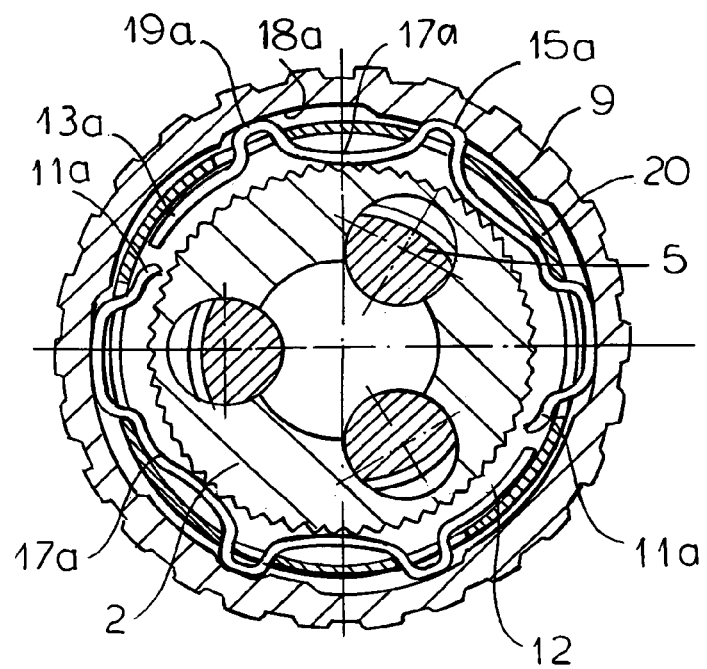
FIGS. 5, 6, and 7 are views like respective FIGS. 2, 3, and 4 of a second chuck according to the invention.
Figure 6:
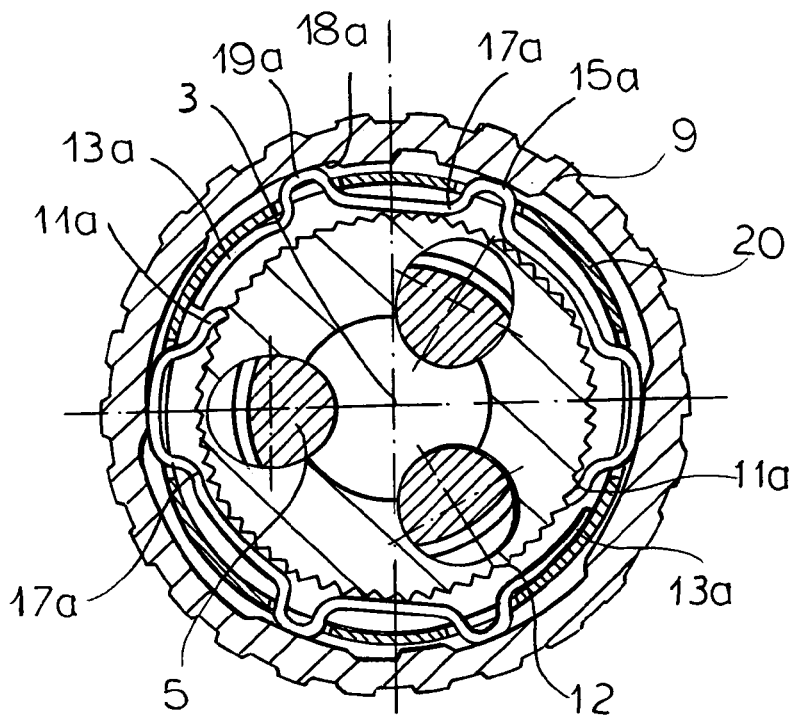
Figure 7:
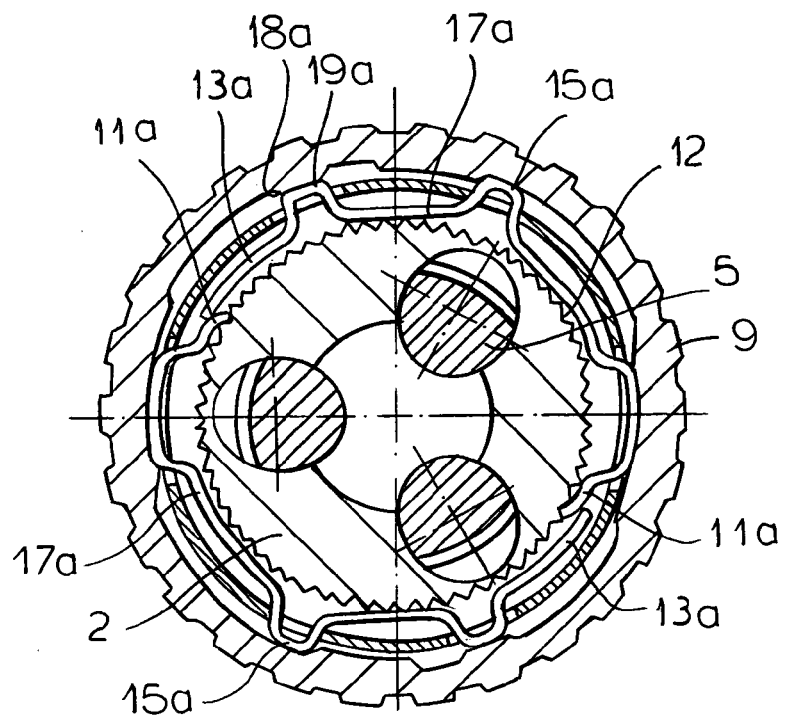

In the system of FIGS. 5 through 7, instead of a single spring 17 extending about 360° around the axis 3, there are two springs 17a each extending about 180° around the axis 3 and each formed at one end with a pawl 11a, at the other end with a locking part 13a, and between them with cam regions 28a, 15a, and 19a. Similarly the sleeve 9 is formed with two cam recesses 14a for the regions 28a, two further cam recesses 18a for the regions 19a, and bumps 16a for the regions 15a. These springs 17a function identically to the spring 17.

Figure 8:
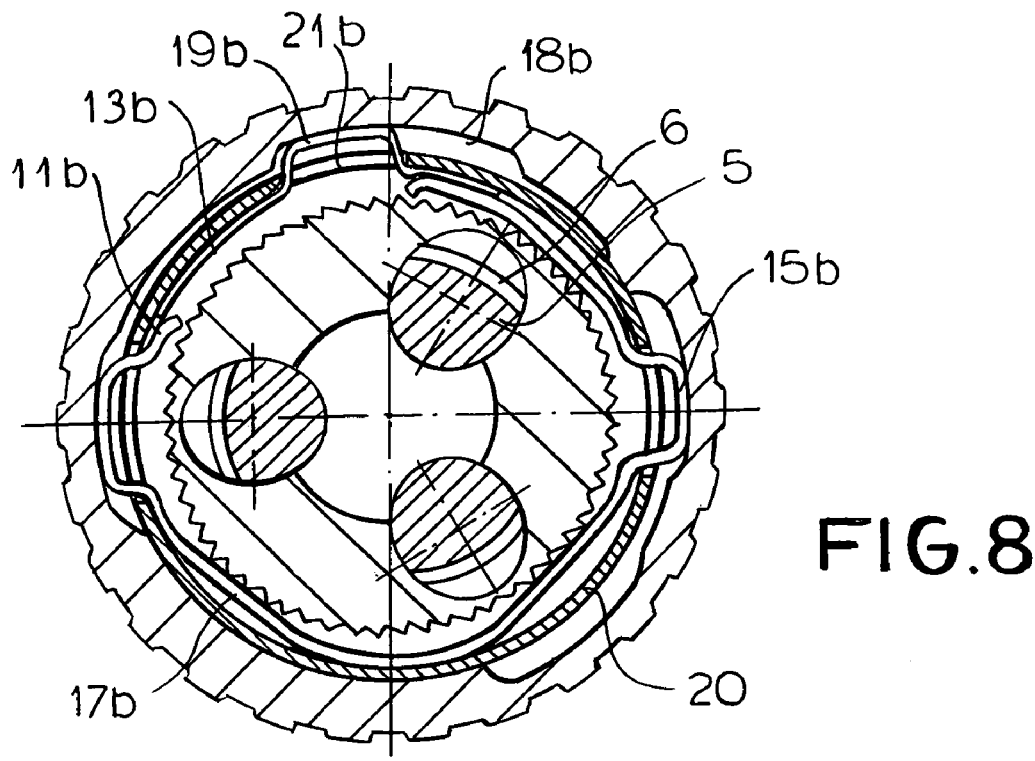
FIGS. 8 and 9 are views like respective FIGS. 2 and 4 of a third chuck according to the invention.
Figure 9:
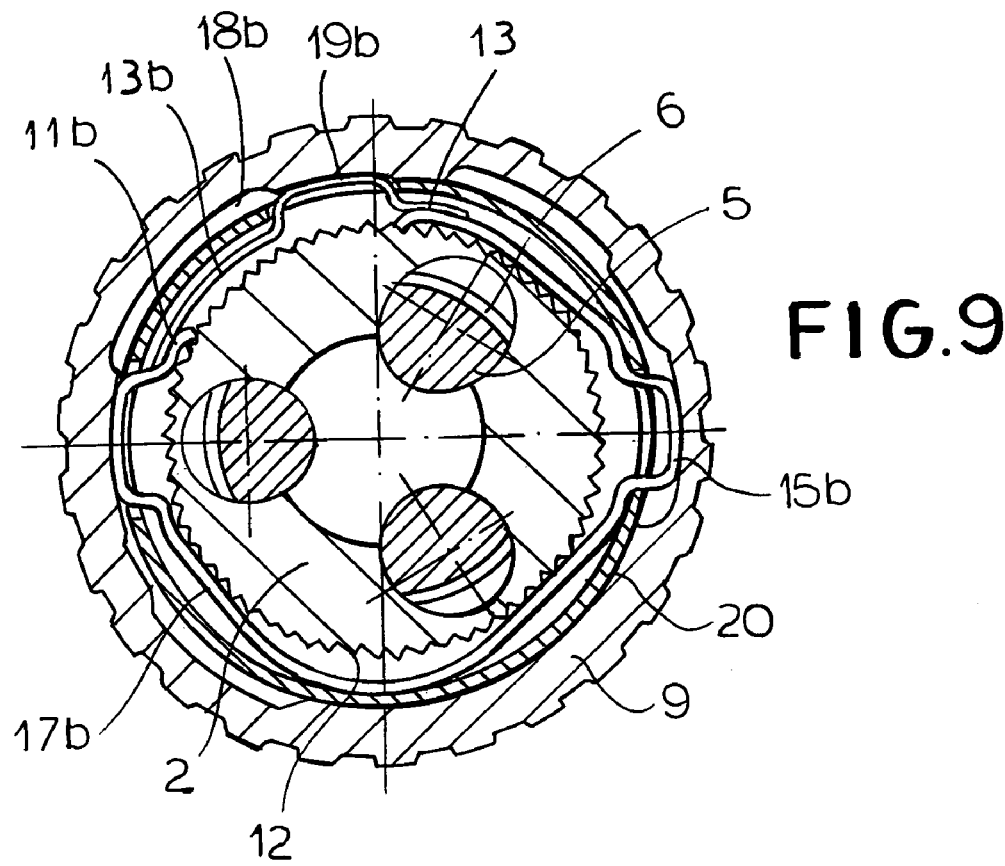

In the arrangement of FIGS. 8 and 9 there are two springs 17b each formed at one end with the pawl 11 and with a region 15b. Here, however, a locking part 13b is a separate part and has a bump or region 19b fitted through a hole 21b in the sleeve 20 and engageable in a cam recess 18b functioning like the recess 18 of FIGS. 1-4. Here there is no angular movement of the part 13b, only radial movement, and the part 15b serves exclusively to retain the system in the unlocked and fully locked positions of respective FIGS. 8 and 9. The part 13b is of thinner stock than the spring 17b and is very stiff so that when pressed inward it solidly locks the pawl 11b in the locked is position.

Figure 10:
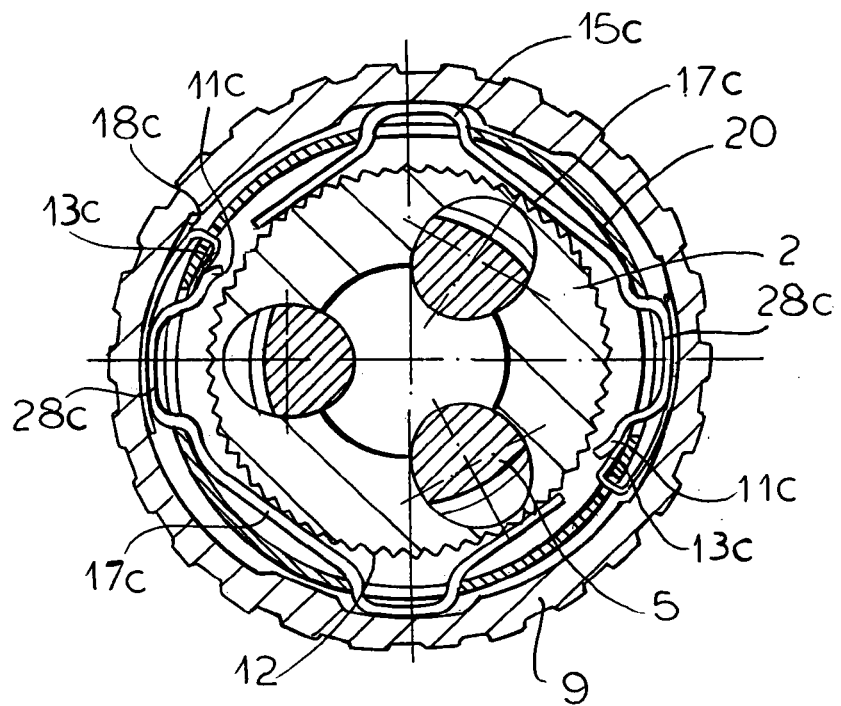
FIGS. 10 and 11 are views like FIG. 2 of a fourth chuck according to the invention.
Figure 11:
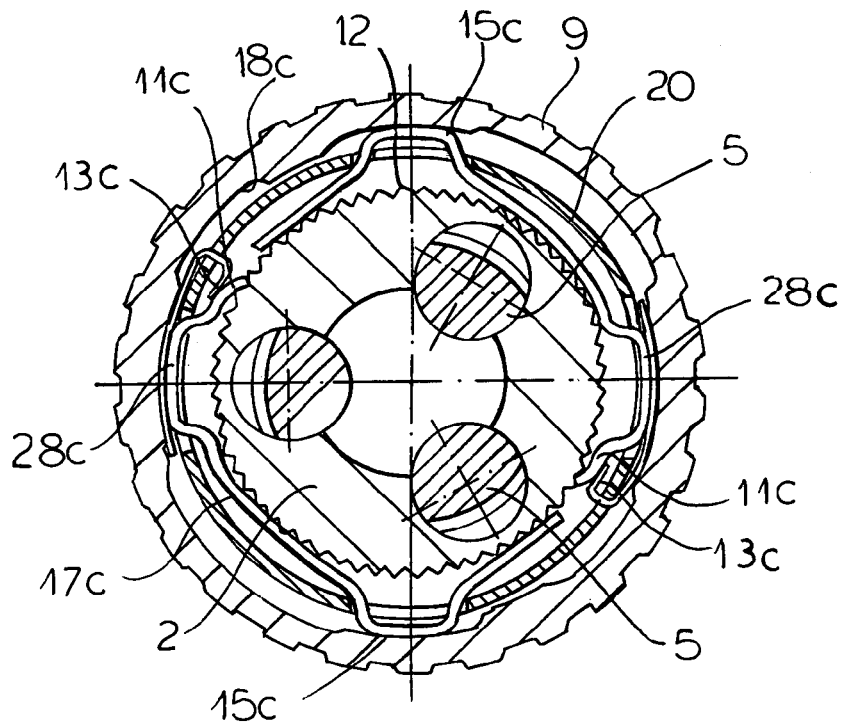

In FIGS. 10 and 11 there are two short springs 17c, somewhat like in FIGS. 5-7, but once again the locking parts 13c here are separate elements. More specifically, each spring 17c has one end forming a pawl 11c and is formed with a bump 28c that moves this pawl 11c in and out, and with another region 15c serving its normal position-retaining function. The parts 13c are J-shaped and each coact with a cam recess 18c but lie mainly outside the sleeve 20 so that they angularly overlap the regions 28c.

We claim:

1. A drill chuck comprising:
    a chuck body rotatable about a chuck axis and provided centered on the axis with an annular array of teeth;
    a plurality of jaws angularly spaced on the body about the axis and radially displaceable relative to the body;
    a tightening ring axially fixed but rotatable about the axis on the body in a tightening direction and in an opposite loosening direction;
    means including a pair of screwthread formations between the tightening ring and the jaws for moving the jaws radially together on rotation of the tightening ring in the tightening direction and for moving the jaws radially apart on rotation of the tightening ring in the loosening direction;
    a pawl engageable with the teeth and angularly fixed on the tightening ring, the pawl being radially displaceable between a retaining position engaging the teeth and preventing rotation of the body relative to the tightening ring in the loosening direction and a freeing position disengaged from the teeth and permitting free rotation of the body relative to the tightening ring in both directions;
    an adjustment sleeve axially fixed but at least limitedly angularly displaceable on the body relative to the tightening ring between a locked end position and an unlocked end position;
    means including a cam on the adjustment sleeve engageable with the pawl for displacing the pawl into the retaining position when the adjustment sleeve is in the locked end position and for displacing the pawl into the freeing position when the adjustment sleeve is in the unlocked end position;
    a locking part engageable with the pawl in the retaining position thereof; and
    means for pressing the locking part against the pawl in the retaining position thereof and thereby pressing the pawl against the teeth.

2. The chuck defined in claim 1 wherein the cam on the adjustment sleeve is a radially inwardly directed cam surface bearing radially on the pawl.

3. The chuck defined in claim 1, further comprising
   means for releasably retaining the sleeve in each of its end positions.

4. The chuck defined in claim 3 wherein the releasable retaining means includes an inwardly projecting bump on the sleeve and a radially displaceable element on the ring shiftable past the bump.

5. The chuck defined in claim 1, further comprising
   means including a cam formation for shifting the locking part angularly between a position angularly overlapping the pawl and a position angularly offset from the pawl.

6. The chuck defined in claim 1, further comprising
   a spring extending angularly at least partially around the chuck body and having one radially deflectable end forming the pawl and an opposite radially extending end forming the locking part.

7. The chuck defined in claim 6 wherein the spring has an outwardly projecting region adjacent each of its ends, the sleeve being formed with a pair of inwardly directed cam surfaces engageable with the regions and one of which constitutes the means for pressing the locking part and the other of which constitutes the adjustment-sleeve cam.

8. The chuck defined in claim 7 wherein the spring is formed between its ends with another outwardly projecting region and the sleeve is formed with another inwardly directed cam surface engageable with the other outwardly projecting region in the locked end position of the adjustment sleeve to move the locking part from a position angularly overlapping the pawl and a position angularly offset from the pawl.

9. The chuck defined in claim 1 wherein the chuck has at least two such pawls, adjustment-sleeve cams, locking parts, and means for pressing.

10. The chuck defined in claim 9, further comprising at least two springs each having one radially deflectable end forming one of the pawls and an opposite radially deflectable end forming one of the locking parts.

11. The chuck defined in claim 1, further comprising
    a spring angularly fixed in the tightening ring, extending angularly of the axis outside the chuck body, having an end forming the pawl, and formed adjacent the end with an outwardly projecting region engageable with the adjustment-sleeve cam.

12. The chuck defined in claim 11 wherein the locking part is angularly fixed relative to the tightening ring and radially displaceable.

13. The chuck defined in claim 12 wherein the locking part extends angularly of the axis outside the chuck body and is angularly fixed relative to the tightening ring.

14. The chuck defined in claim 13 wherein the locking part has an end engageable with the pawl and an outwardly projecting region engageable with the means for pressing.

15. The chuck defined in claim 13 wherein the locking part is J-shaped.

16. The chuck defined in claim 1, further comprising
    a coupling sleeve angularly fixed to the tightening ring and to the pawl.

17. The chuck defined in claim 16, further comprising
    an angularly extending spring having one end forming the pawl, an opposite end forming the licking part, and an outwardly projecting region between these ends engageable with the adjustment-sleeve cam, the coupling sleeve being formed with a window through which the projecting region fits and which angularly locks the coupling sleeve to the spring.

18. The chuck defined in claim 16 wherein the coupling sleeve has an axially projecting portion and the adjustment sleeve is formed with a radially inwardly open notch in which the axially projecting portion is received with substantial play.

19. The chuck defined in claim 1 wherein the adjustment-sleeve cam and the means for pressing each include an inwardly open cam recess formed on the adjustment sleeve.

20. The chuck defined in claim 19 wherein the pawl and the locking part have radially outwardly projecting regions fitting in the cam recesses in the respective unlocked and freeing positions.

* * * * *